UNITED STATES PATENT OFFICE.

ALBERT F. GESCHEIDER, OF BALTIMORE, MARYLAND, ASSIGNOR OF ONE-HALF TO FRANK A. PERSOHN, OF BALTIMORE, MARYLAND.

ESCAPEMENT.

No. 807,261.   Specification of Letters Patent.   Patented Dec. 12, 1905.

Application filed May 9, 1905. Serial No. 259,568.

*To all whom it may concern:*

Be it known that I, ALBERT F. GESCHEIDER, a citizen of the United States of America, and a resident of Baltimore, in the State of Maryland, have invented certain new and useful Improvements in Escapements for Secondary Clocks, of which the following is a full and clear specification, reference being had to the accompanying drawings, in which—

Figure 1:
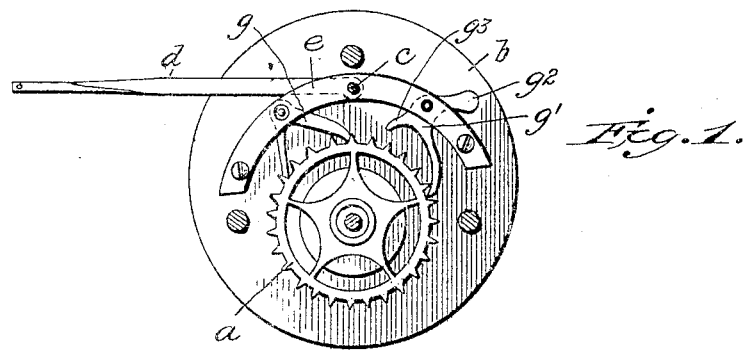
Figure 2:
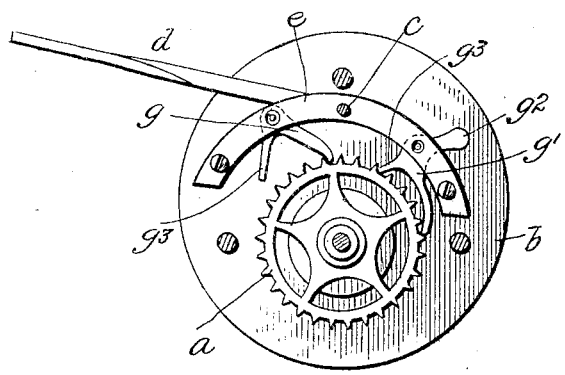
Figure 3:
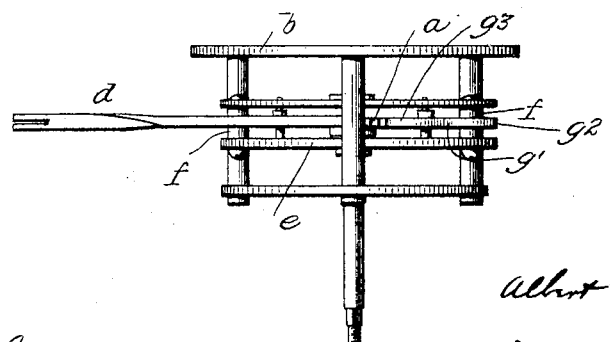

Figure 1 is a side elevation with one of the side plates of the frame removed; Fig. 2, a similar view showing the pawls in another position, and Fig. 3 a plan view.

The object of this invention is to improve and simplify the pawl devices for rotating the toothed wheel carried by the minute-hand, as more fully hereinafter set forth.

To the accomplishment of this object and such others as may hereinafter appear the invention consists of the parts and combination of parts hereinafter fully described, and particularly pointed out in the appended claim, reference being had to the accompanying drawings, forming a part of this specification, in which the same reference characters designate like parts throughout the several views.

Referring to the drawings by reference characters, the letter $a$ designates the usual toothed wheel carried by the minute-hand arbor, which latter is journaled in the usual frame-plates $b$. Journaled in the frame-plates above the wheel $a$ in alinement with the axis thereof is a shaft $c$, to which is rigidly connected the lever $d$, whose outer end is adapted for connection to the usual glycerin pump or pulsometer. Also rigidly attached to the shaft $c$ is the pawl-carrying frame, which consists of a pair of semicircular plates $e$, attached to the shaft $c$ upon opposite sides of the lever $d$ and braced at their depending ends by the spacing-pins $f$.

Pivotally hung between the plates $e$ are a pair of pawls $g$ $g'$, one being located at each side of the shaft $c$. The pawl $g$ extends inwardly and engages the teeth of the wheel $a$ at approximately above the center thereof, while the pawl $g'$ engages the teeth of the wheel at the right side of the wheel. Both the pawls are held in normal engagement with the teeth—pawl $g$ by its own weight and the pawl $g'$ by means of a supplemental weight $g^2$, projecting outwardly to the right at a point about in line with its pivot. As thus constructed it will be observed that as the lever $d$ is vibrated up and down the pawls will alternately engage the teeth of the wheel and rotate it the distance of one tooth to the right with each pulsation of the pump. To prevent the wheel moving more than the distance of one tooth with each pulsation, I provide each of the pawls with a depending lock-finger $g^3$, which when the pawl is in working engagement with one of the teeth of the wheel will positively engage another tooth to the rear of the one in engagement and positively lock the wheel against further rotation. This alternate positive locking action is shown clearly in Figs. 1 and 2, the pawl $g$ being in action in Fig. 1 and the pawl $g'$ being in action in Fig. 2. The pawl not in action is obviously simply in loose engagement with the wheel with its lock-finger swung away from the wheel. It will be observed that the relative angle of the pawl and its lock-finger must be such that they engage the opposing faces of two of the teeth of the wheel and press in opposite directions against the same, as shown, so that lost motion shall be entirely eliminated and the device rendered reliable in the highest practicable degree.

It will be apparent to those skilled in the art that various mechanical embodiments of the invention are possible, and I therefore do not wish to be limited to the exact arrangement and construction shown.

What I claim, and desire to secure by Letters Patent, is—

In a device of the class described, the combination of a frame, a wheel carried by a shaft journaled in the frame, a rocking pawl-carrying frame mounted over the wheel and means for rocking this frame, and a pair of pawls carried by this frame and pivotally depending therefrom and normally resting in engagement with the teeth of the wheel, one pawl disposed at each side of the axis of movement of the pawl-carrying frame and each pawl being provided with a locking-finger which is adapted to engage a tooth of the wheel when its pawl is in working engagement with the wheel, substantially as set forth.

In testimony whereof I hereunto affix my signature, in the presence of two witnesses, this 3d day of May, 1905.

ALBERT F. GESCHEIDER.

Witnesses:
 FRANK A. PERSOHN,
 EDWIN C. COLLINS.